Dec. 1, 1964  F. D. JAMES ET AL  3,159,738
AIRCRAFT GROUND RUN PREDICTORS
Filed May 12, 1961  3 Sheets-Sheet 2
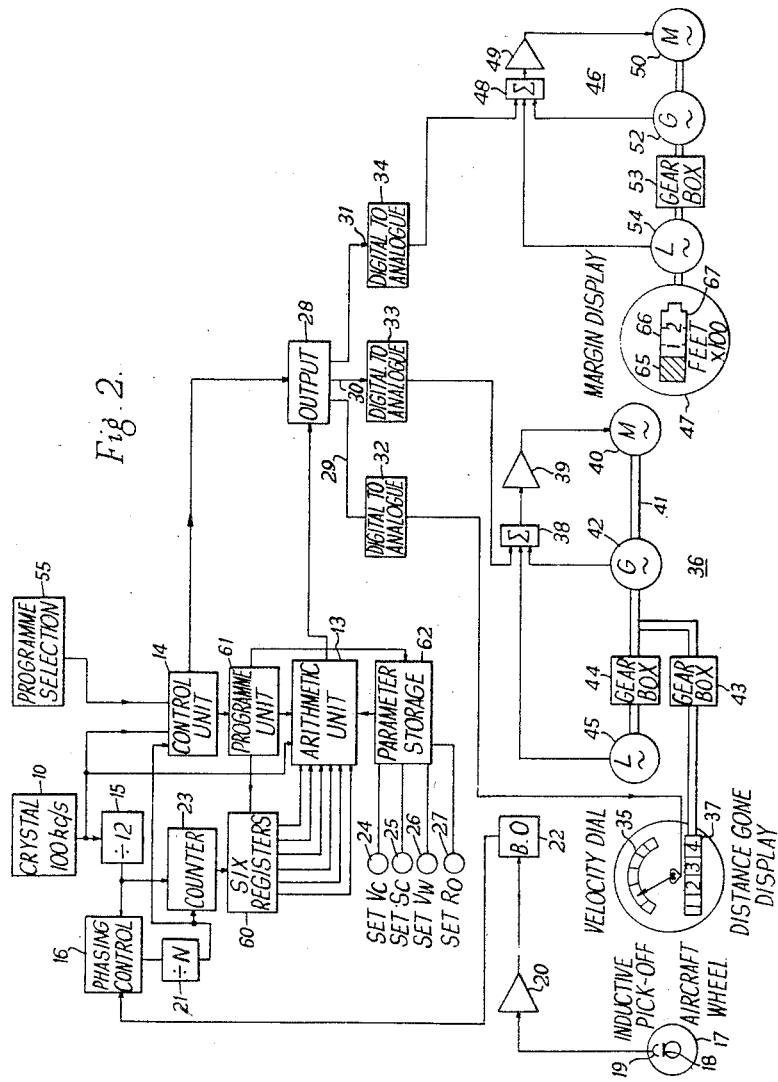

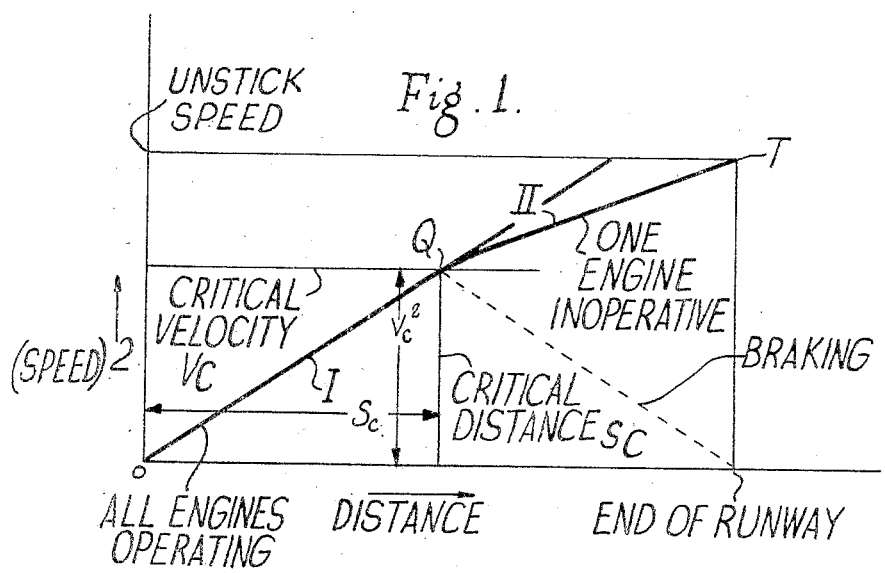
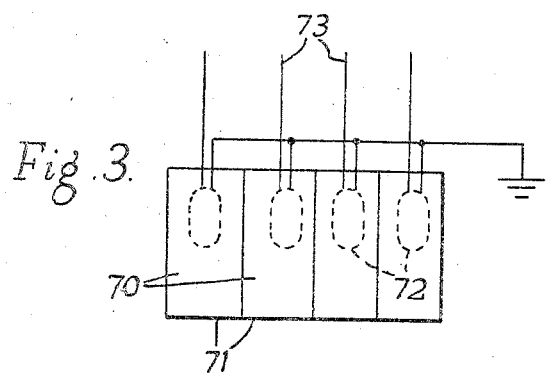
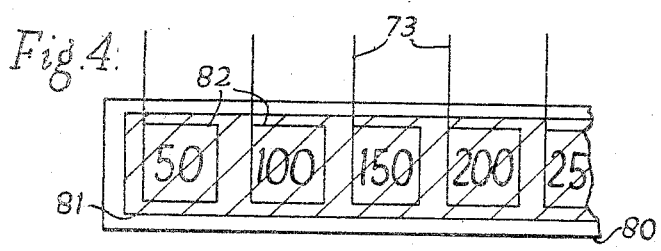
F. D. JAMES
D. A. RUSH
INVENTORS

Dec. 1, 1964         F. D. JAMES ET AL         3,159,738
                AIRCRAFT GROUND RUN PREDICTORS
Filed May 12, 1961                              3 Sheets-Sheet 3
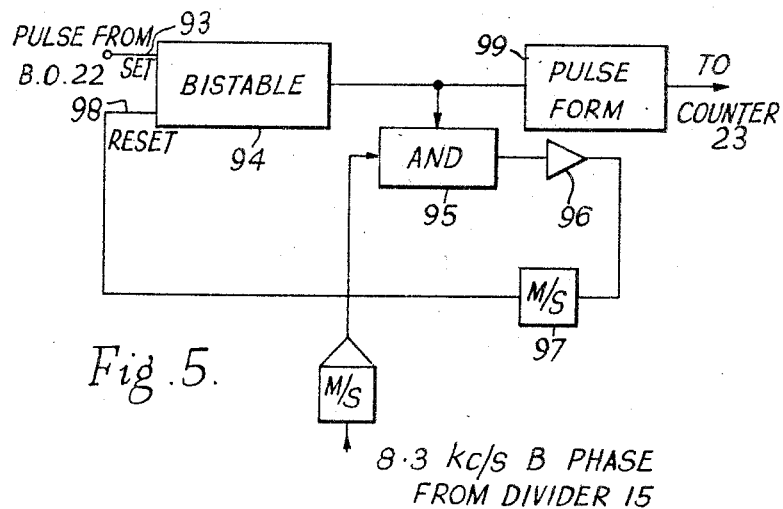
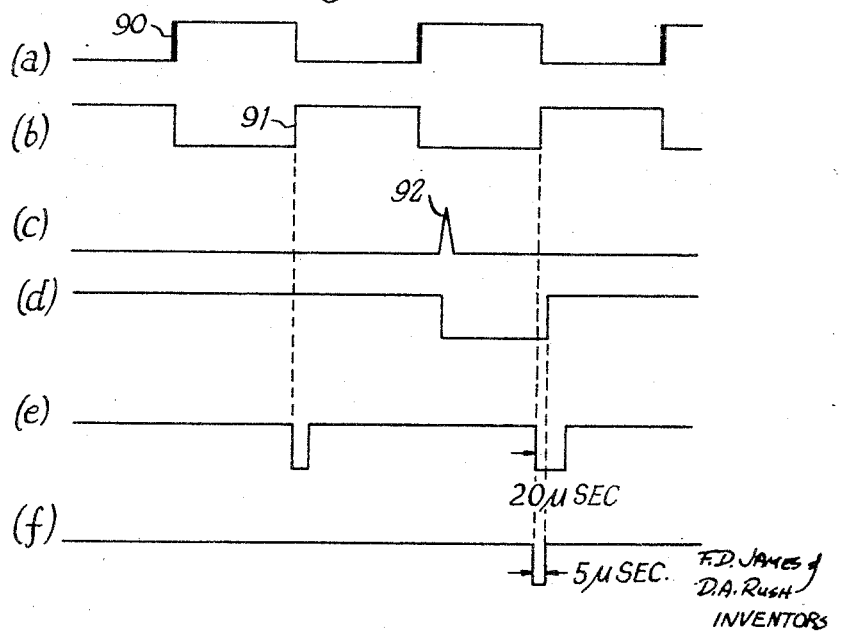

United States Patent Office 3,159,738
Patented Dec. 1, 1964

3,159,738
AIRCRAFT GROUND RUN PREDICTORS
Frederick David James and Derek Anthony Rush, London, England, assignors to S. Smith & Sons (England) Limited, London, England, a British company
Filed May 12, 1961, Ser. No. 109,639
Claims priority, application Great Britain May 20, 1960
13 Claims. (Cl. 235—152)

The present invention relates to aircraft ground run predictors.

For a given aircraft under given conditions a "critical velocity" ($V_c$) can be specified. This is the velocity at the "critical point" on the appropriate take-off ground run plot of velocity (or a function thereof) against distance, being a point before (or, in the limit, at) the intersection of this plot with the braking plot passing through the end of the runway at velocity=0. The determination of the critical point, critical velocity and the corresponding critical distance ($S_c$) is made on a somewhat arbitrary basis by those concerned to see that a safe take-off will be made. The pilot of the aircraft is considered to be committed to take-off once the critical distance is reached. The critical velocity should be reached before this distance.

In the case of four-engined civil aircraft, present day take-off procedure requires the pilot to abandon take-off if one or more engines fail before the speed of the aircraft during its ground run reaches the critical velocity. For such an aircraft $V_c$ is a pre-calculated airspeed less than the take-off or "unstick" speed of the aircraft by such an amount that, if one engine fails after the critical velocity is reached the take-off can safely continue, because the aircraft can still accelerate to unstick speed before the end of the runway is reached. This criterion has to be modified if there are objects or geographical features such as high buildings, towers, mountains or the like, beyond the end of the runway which may impose a severer limitation such that the unstick speed must be reached before some point nearer than the end of the runway. It will be appreciated that such allowances are readily effected in the present invention and are omitted from the following discussion only for sake of simplicity. It follows that the end of the runway is not the sole criterion for determining the critical point.

It is an object of the present invention to provide an improved aircraft ground run predictor adapted for predicting continuously, in operation, the margin between the predicted distance at which an aircraft will reach its critical velocity and the critical distance.

According to the present invention, a ground run predictor for an aircraft comprises means for generating signals defining successive intervals of time during which the aircraft travels the same predetermined distance along the ground, means controlled by said signals for generating further signals representative of the durations of the said intervals and for storing the said further signals pertaining to the last $n$ intervals of time (where $n$ is at least three) and a digital computer coupled to an indicator, the computer being responsive to the $n$ further signals and to signals representing the distance travelled by the aircraft to compute the velocity and acceleration of the aircraft and to derive therefrom and apply to the indicator a signal representing the margin between the critical distance and the distance at which take-off is calculated to occur.

The said intervals can be contiguous, as in the embodiment hereinafter described, but this is not necessarily so and the intervals may be spaced apart in time.

The said means for generating the further signals can comprise a source of regularly recurrent pulses and means for counting the pulses occurring during each of the said intervals. The counts for the last $n$ intervals are then stored in $n$ registers.

A number of different arrangements may be employed to obtain the stored counts in the registers. A separate counter may be employed to count the regularly recurrent pulses, at the end of each interval the count being transferred to one of the registers. This may always be a first one of the registers, it also being arranged to shift the count in the first register into the second register, the count in the second register into the third register (and so on if there are more than three registers) at the end of each interval. Alternatively the counts may be transferred to the registers in sequence, no transfer taking place between the registers themselves. In this case the computer must be supplied with information as to which register holds the last count, which the next preceding count and so on.

In another arrangement the registers themselves are employed in sequence as counters. Again it is then necessary to supply information to the computer as to which register holds which count and it may also be ensured that the computer does not have regard to any register whilst that register is in process of counting.

The counter may be fed with the regularly recurrent pulses through a gate circuit which is opened only during the said intervals by the signals defining the intervals, the counter being cleared between each pair of successive intervals. Alternatively each of the successive signals defining the successive intervals may reset the counter to zero, the counter recommencing the counting of the regularly recurrent pulses after each resetting. When the registers are employed in sequence as counters more complex switching circuits are required to apply the pulses to the registers.

The first said signals can be generated from an inductive pick-off on a wheel of the aircraft using suitable pulse-shaping techniques together with frequency division or multiplication, if required.

If a pick-off on the wheel is used the aircraft needs no external assistance to enable it to define the successive intervals of time. There is clearly a variety of alternative procedures which might be used, both those where the aircraft is independent of an external means and those where some external means are necessary. As an example of the latter category, the possibility of providing equally-spaced metallic members along the length of the runway can be mentioned. Such members would be sensed as the aircraft passed them.

The invention will now be described, by way of example, with reference to the accompanying drawings in which:

FIG. 1 is an explanatory diagram showing a representative plot of speed squared against distance along the runway as an aid in defining "critical velocity," "critical distance" and "unstick speed,"

FIG. 2 is a block circuit diagram of one embodiment of the invention,

FIG. 3 is a diagram of a margin display indicator,

FIG. 4 is a diagram of another margin display indicator,

FIG. 5 is a more detailed block diagram of part of FIG. 2, and

FIG. 6 shows certain explanatory waveforms illustrative of the block diagram of FIGURE 5.

FIG. 1 shows the relationships between critical velocity and distance, the graph I for all engines operating and the graph II for one engine inoperative on a (speed)$^2$ versus distance plot for a four engined civil aircraft. The graph I is drawn from the origin at the start of the ground run. The graph II is projected back from the point T defined by the end of the runway and the unstick speed.

Two phases can be defined, one from the origin to the intersection of graph I and the braking curve shown in broken lines and the second from the intersection of graphs I and II at point Q to unstick speed.

It will be clear that in the limiting case shown where the two phases just meet, if one engine fails before the point Q is reached, it is always possible to brake and come to rest before reaching the end of the runway. If one engine fails after the point Q has been reached the aircraft is sure of being able to accelerate to the unstick speed before coming to the end of the runway.

In this instance the point Q can be made the critical point defining critical speed $V_c$ and critical distance $S_c$ as shown.

If the phases overlap the safety margin is greater since in the region of overlap either continued acceleration or braking is safe if one engine fails. A critical point somewhere along graph I between the point Q (intersection of graphs I and II) and the intersection with the braking graph can then be chosen.

If there is a gap between the phases the aircraft can neither be brought to rest in the remaining runway length by braking nor can unstick speed be reached if an engine fails in the gap. No critical point could be defined and the take-off should not be attempted. In what follows it is implicit that a satisfactory critical point has been selected, giving pre-determined values for $V_c$ and $S_c$.

If acceleration $a$ is constant we have

Distance $= (V_1^2 - V_2^2)/2a$ (Newton's equation)

At any instant during take-off the predicted distance D remaining to achieve critical velocity $V_c$ is given by $$D = (V_c^2 - V^2)/2a$$

where V is the instantaneous velocity. Moreover $$D = S_{vc} - S$$

where $S_{vc}$ is the predicted distance to achieve critical velocity measured from the start of the run. Therefore $$S_{vc} = S + (V_c^2 - V^2)/2a \quad (1)$$

Because acceleration is not constant $a$ in the above Equation 1 is replaced by $a/h$ where $h$ is a modifying function taking into account the decrease in aircraft acceleration due to drag and other effects as the take-off proceeds. Thus $$S_{vc} = S + h(V_c^2 - V^2)/2a$$

A take off margin $M = S_c - S_{vc}$ $$= S_c - S - h(V_c^2 - V^2)/2a \quad (2)$$

is thus defined, being the difference between the critical distance $S_c$ and the predicted distance $S_{vc}$ which is the distance where critical velocity $V_c$ will be reached.

Computation is based upon Equation 2 in the embodiment of the invention shown in FIG. 2.

The ground run predictor shown in FIG. 2 comprises a crystal-controlled pulse generator 10 adapted to generate regularly-recurring pulses at a repetition frequency of 100 kc./s. This is connected to the arithmetic unit 13 and the control unit 14 of a digital computer and through a frequency-divider 15 of 12:1 ratio to a phasing control network 16.

Associated with the wheel 17 of an aircraft in which the apparatus is fitted there is a further pulse generator comprising a piece of magnetic material 18 on the wheel, so positioned as to modify the reluctance of the magnetic circuit of an inductive pick-off 19 once per revolution of the wheel.

The pulses generated in the pick-off 19 are shaped in an amplifier and trigger circuit 20 and are passed to trigger a blocking oscillator 22 which operates to produce a short, sharp output pulse for each input pulse applied from the circuit 20.

The pulses generated by the blocking oscillator 22 are applied to the phasing control circuit 16 together with an output from the frequency divider 15. The phasing control circuit 16 operates so as to provide an output pulse for each pulse received from the blocking oscillator 22, each output pulse being positioned substantially midway in time between successive pulses from the frequency-divider 15.

The correctly-phased pulses are fed to a dividing circuit 21 which produces one output pulse for every N input pulses. In each interval of time between two successive pulses from the dividing circuit 21 the aircraft has travelled a predetermined distance equal to N times the circumference of the wheel 17. The integer N is determined in any particular case to give convenient circuit operating conditions for a given set of aircraft characteristics, and may for example be some small number such as two or four.

A further output from the frequency divider 15 is applied to a counter 23 which supplies six registers 60. One output from the divider 21 is also applied to the counter 23 and each pulse thus applied to the circuit 23 from the circuit 21 is effective to reset or empty the counter and at the same time to transfer the number previously registered in the counter to the first one of the registers. In addition the output of the circuit 21 is applied to the control unit 14 and effects transfer of any number previously stored in the first register to the second register and so on along the chain of registers. This control is effective by way of the programme unit 61 of the computer. Procedures for shifting counts from register to register are well known in the electronics art. In this manner, there will be available, stored in the registers 60, counts representing the number of pulses appearing at the output of the frequency divider 15 between successive ones of the pulses generated by the dividing circuit 21, that is in successive ones of the aforesaid intervals. Provided there are at least three such registers, it is obviously possible to compute from these counts by means of difference formulae both the velocity and acceleration of the aircraft. A larger number of registers, namely six in the present embodiment, is desirable to achieve satisfactory smoothing of the values computed as explained below. Each of the registers 60 is coupled to the arithmetic unit 13 of the computer to enable the necessary transfer of counts to take place in parallel. The signal from circuit 21 determines when transfers shall take place.

In addition, for enabling the arithmetic unit to calculate the distance travelled by the aircraft, the output of the circuit 21 is fed to that unit by way of units 14 and 61, the pulses thus applied to the arithmetic unit 13 being stored in a counting register of the computer (not separately shown).

Four controls 24 to 27 are connected to a parameter storage unit 62 and are used to set the critical velocity $V_c$, the critical distance $S_c$, the wind speed $V_w$ and a figure corresponding to the effective rolling radius $R_0$ of the wheel 17 respectively for supply to the arithmetic unit of the computer.

By way of an output unit 28 three outputs are applied to conductors 29, 30 and 31 representative respectively of instantaneous velocity V, a distance traversed S, and the margin M between the critical distance and the distance at which take-off is calculated to occur.

The pulses appearing in these conductors are converted into voltage analogues by three digital-to-analogue converters 32, 33 and 34 respectively, the converters being of any convenient known form.

A velocity indicator 35 is connected directly to the output of the converter 32 and indicates the ground speed V of the aircraft.

The output of the converter 33 is connected through servo mechanism 36 to a distance indicator 37. The servo mechanism is conventional and comprises an adder circuit 38 coupled through an amplifier 39 to a motor 40. The shaft 41 of the motor 40 is coupled to a tachometer generator 42 providing rate feedback to the adder 38. The motor shaft 41 is also connected through a gearbox 43 to the distance indicator 37 and through a further gearbox 44 to a further pick-off 45 providing position feedback to the adder 38.

The output of the converter 34 is applied through another servo mechanism 46 to an indicator 47 for indicating the margin between the critical distance and the calculated take-off distance. The servo mechanism 46 is of the same construction as the servo mechanism 36, the parts 48 to 54 of the mechanism 46 corresponding to the parts 38 to 42 and 44, 45 respectively of the mechanism 36.

The information supplied to the computer by the registers consists of six counts which are proportional to successive times taken for the aircraft to travel equal distances $2\pi NR_0$. The arithmetical operations involved are discussed below. No details of the computer are given however as it is well known how to arrange and control a computer to perform these arithmetic operations in accordance with the foregoing and succeeding description.

For example a small general purpose computer as commercially available today could readily be programmed to perform the operations. In practice it will be preferred to design a special purpose computer to reduce weight as much as possible, but such design would not involve invention in view of the present state of the computer art.

By way of a brief indication however the arithmetic unit 13 can consist basically of a series of logical elements, using transistors and diodes as active elements, arranged to be capable of addition, subtraction, multiplication and division, together with five registers capable of storing information processed by the computer. The control unit 14 directs the computer via the programme unit 61 to calculate the appropriate mathematical relations of the programme by a series of arithmetical operations of the four types just mentioned. The programme unit stores a permanent programme which is repeated for each fresh calculation of M. This unit 14 also switches the results of the computations into the output unit 28 which requires three registers from which the three output displays are driven. The control unit is constructed using similar active elements to those in the arithmetic unit whilst the programme unit takes the form of a matrix of diodes arranged to produce the pre-coded orders in the sequence dictated by the control unit.

The formula on which computation is effected is given above as Equation 2. The parameters on the right hand side are $S_c$ and $V_c$ which are set by controls 25 and 24. S, V, $a$ and $h$ all have to be calculated.

The pulses from the circuit 21 divide the distance run into intervals of ltngth $C=2\pi NR_0$.

The number of system pulses from the unit 15 occurring between successive gating pulses are counted. The number (the "pulse count number") $P_n$, counted during the $n$th distance interval, is proportional to the time $T_n$ taken to cover the distance C of that interval. From these pulse-count numbers it is possible to compute values for the velocity and acceleration at the end of each interval.

Basic formulae for velocity and acceleration at a distance $S_n$ can be obtained by fitting a quadratic in time through three successive distance interval end points, $S_{n-2}$, $S_{n-1}$, $S_n$. This leads to the following expressions in terms of two successive pulse count numbers $P_{n-1}$, $P_n$, $$V_n = \frac{FC(P_{n-1}^2 + 2P_{n-1}P_n - P_n^2)}{P_{n-1}P_n(P_{n-1}+P_n)}$$

$$a_n = \frac{2F^2C(P_{n-1}-P_n)}{P_{n-1}P_n(P_{n-1}+P_n)}$$

F is the frequency at the output of unit 15.

Because of the occurrence in the numerator of the acceleration formula of the difference of two numbers which are often nearly equal, the acceleration measurement is particularly susceptible to errors in the measured pulse count numbers. To reduce such effects it is possible to devise formulae in which pulse count numbers corresponding to more than the two immediately preceding distance intervals are used.

As an example $$a_{n-3} = \frac{6F^2C(P_{n-5}+P_{n-4}+P_{n-3}-P_{n-2}+P_{n-1}-P_n)}{(P_{n-5}+P_{n-4}+P_{n-3})(P_{n-2}+P_{n-1}+P_n)(P_{n-5}+P_{n-4}+P_{n-3}+P_{n-2}+P_{n-1}+P_n)}$$

which is the formula requiring 6 pulse counts used in the present embodiment.

Since the acceleration formula gives a value $a_{n-3}$, a velocity formula which is an approximation to $V_{n-3}$ is adopted. If at the same time the value of distance used is that of the $n-3$ intervals instead of the $n$ intervals, then the total prediction formulae will be giving a prediction accurate for the conditions 3 intervals back. This may be considered as the "distance lag" of the device.

The revised velocity formula is $$V_{n-3} = \frac{\{(P_{n-5}+P_{n-4}+P_{n-3})^2 + (P_{n-2}+P_{n-1}+P_n)^2\}}{(P_{n-5}+P_{n-4}+P_{n-3})(P_{n-2}+P_{n-1}+P_n)(P_{n-5}+P_{n-4}+P_{n-3}+P_{n-2}+P_{n-1}+P_n)}$$

The distance $S_{n-3}$ is of course simply $(n-3)C$. The number $n$ is held in the above mentioned counting register.

Without the modifying function $h$ the prediction formula would be true only for a constant acceleration take-off. With an acceleration that varies with airspeed V according to a law $$a = a_0 f(v) = a_0 f(V + V_w)$$

where $V_w$ is windspeed the prediction formula $$M = S_c - S - h(V_c^2 - V^2)/2a$$

will be correct if the modifying function $h$ is given by $$h = \int_V^{V_c} \frac{VdV}{f(V+V_w)} \bigg/ \frac{V_c^2 - V^2}{2f(V+V_w)}$$

From the formula it will be seen that the modifying function will depend on the values of $V_c$ and $V_w$ as well as on the form of the function $f(v)$. It will be noted that the value of $V_w$ is supplied to the computer by pre-set control 26. In the digital computer the modifying function actually appears as $$H = \frac{V_c^2 + (V_c - V)\{V[b(V_c) + c(V_w)] + V_c[b'(V_c) + c'(V_w)]\}}{V_c^2}$$

where $b(V_c)$, $c(V_w)$, $b'(V_c)$, $c'(V_w)$, are constants selected by switches for $V_c$, $V_w$.

The parameters to be found are the values $b(V_c)$, $c(V_w) b'(V_c) c'(V_w)$. In order to find these, ranges of values of $V_c$ and $V_w$ are needed, together with the form of $f(v)$, the normalised mean acceleration characteristic. The parameters can then be chosen so that H is as close as possible to the desired value of $h$. H is a function having values only at a limited number of values of $V_c$ and $V_w$ while $h$ is a continuous function of $V_c$ and $V_w$.

Because the variations of $h$ with respect to $V_c$, $V_w$ are not independent, while H is taken in a form in which variations with respect to $V_c$, $V_w$ are independent, it is not possible to make the values of H and $h$ coincide throughout the range.

In the first instance the normalised mean acceleration characteristic $f(v)$ must be determined for the particular type of aircraft. The best data to work from are the engine thrust characteristics, coupled with the drag and lift coefficients of the aircraft in ground run attitude.

The take-off run equation may be written as $$a\frac{W}{g} = T - \mu(W-L) - \theta W - D$$

where T is thrust, W weight, L lift, D drag, $\mu$ the runway coefficient of friction and $\theta$ the runway slope in radians.

In general T is a function of velocity while $$D \propto C_D v^2$$
$$L \propto C_L v^2$$
$$W \propto C_{LO} v_{TO}^2$$

where $C_{LO}$ is the lift coefficient in take-off attitude as opposed to the value $C_L$ in ground run attitude.

$$\therefore \frac{a}{g} = \frac{T}{W} - (\theta + \mu) - \left[\frac{C_D - \mu C_L}{C_{LO}}\right]\frac{v^2}{v_{TO}^2}$$

$$= \frac{a_o f(v)}{g}$$

Ideally the function $f(v)$ must be determined for a variety of possible take-off conditions, if the full data is available. These will include ranges of temperature and pressure (at airfield height) as well as the range of aircraft loaded weight. These may be plotted together, and an average curve drawn minimising the differences due to varying conditions.

The margin display 47 shown schematically in FIG. 2 comprises a moving strip having a black port 65 (shaded) and a white part 66 graduated in 100's of feet. So long as a margin remains some of the white part is visible and the length of the margin can be read off at the right hand end of the window 67 through which the strip is visible. If the white part disappears no margin exists.

It can be arranged that when the computed velocity equals the set-in critical velocity $V_c$, a shutter bearing the legend "Critical Velocity Achieved" covers the moving strips. Furthermore a distinguishing flag could be made to appear in front of both the strip and the shutter, in the event of power failure.

Another form of margin indicator is more directly suited to digital techniques. As before, the value of the computed margin is represented by a white strip viewed through the instrument window, but in this design there are no moving parts. The white strip is made up of discrete lengths corresponding to 50 ft. intervals and capable of independent illumination.

One way of producing this is illustrated in FIG. 3 which shows a display unit in plan view. The unit comprises a plurality of blocks 70 of transparent material stacked together with opaque material (not shown) such as silver foil between and around each block, except over the front faces 71. These faces are engraved with the distances 50 ft., 100 ft., and so on.

Miniature lamps, indicated schematically at 72 are inserted in a hollow of each block and individual leads 73 allow for individual energisation of the lamps. If the margin M is 150 ft. the lamps of the first three blocks are illuminated and the figures 50, 100 and 150 feet are displayed. When the margin disappears the whole unit is dark.

No detailed circuitry for controlling this unit is shown as it will be obvious that a digital computer output can be used readily. For example the computer output can be matrixed to give appropriate energization of matrix output conductors corresponding to the blocks 70 in accordance with the requirements described. The matrix output conductors may be the leads 73 or may control energisation of respective ones of these by way of relays.

The alternative unit shown in FIG. 4 can be controlled in like fashion. In this unit a strip is made up of an earthed conductive backing 80 coated with a layer 81 of electroluminescent material. Transparent conductive panels 82 are deposited along this and connected to the conductors 73 respectively. The distances are painted over the panels 82.

One form which the circuit 16 can take is illustrated in FIG. 5 and the waveforms of FIG. 6 are used in explaining this. The 8.3 kc./s. signal from circuit 15 is available in A and B phases as shown at (a) and (b) in FIG. 6. The pulses counted by counter 23 are defined by the heavily drawn rising fronts 90 of phase A. The rising fronts 91 of phase B are used to define the position of the correctly phased output pulses from circuit 16, which are therefore substantially midway between the counted pulses. If this were not done, transfer from counter 23 to registers 60 could take place during a carry propagation in the counter, causing an incorrect number to be transferred.

A pulse 92 from the blocking oscillator 22 occurring at an arbitrary time with respect to phases A and B is shown at (c) in FIG. 6. This pulse is applied to the "set" input 93 of a bistable circuit 94. The output from the bistable is waveform (d) in FIG. 6. This output is applied to an "and" gate 95. The other input to the gate is derived from phase B which is applied to a 20 $\mu$sec. monostable circuit with inverted output, shown at (e) in FIG. 6. The resulting output pulse from the gate 95 is a 5 $\mu$sec. pulse (f), the short duration resulting from resetting of bistable 94 by means of the pulse (f) applied through an inverting amplifier 96 and a 5 $\mu$sec. monostable circuit 97 with inverted output to the reset terminal 98 of bistable 94. As shown the phased output is taken from the bistable 94, through a pulse forming circuit 99. An output could alternatively be derived from the chain 95, 96, 97. The output from 99 is applied through divider 21 to the counter 23.

It can be arranged that the first pulse produced by circuit 99 clears the apparatus of any previously stored counts. The pulses from circuit 16 are delayed up to 1/8.3 milliseconds from the pulses from blocking oscillator 22.

In landing an aircraft it is valuable for a pilot to have an indication of the margin between the end of a runway (or another predetermined distance along the runway) and the calculated distance in which the aircraft will come to rest.

If $X_L$ is the distance in which the aircraft has to be brought to rest and $X_p$ is the calculated distance for bringing the aircraft to rest the margin to be displayed is $X_L - X_p$. At any instant during landing the aircraft will have already travelled a distance X along the runway and $X_p$ can be deduced from the expression $$X_p - X = h_L V^2 / 2b$$

where V represents instantaneous velocity as before b represents deceleration and $h_L$ is a modifying function related to the aircraft's landing characteristics.

As X, V and b can all be derived from the counts supplied to the computer the computer can be used with suitable modification of its programme for indicating $X_L - X_p$. To this end a programme selection switch 55 is connected to the control unit 14. The same indicators are used on take-off and landing. It will be obvious that the computer can also readily be given a programme for use in taxiing to display simply distance gone and velocity. This can again be selected by unit 55. The operational value of a display of these two quantities when manoeuvring the aircraft on the ground will be most apparent under low visibility conditions assuming that some form of azimuth guidance is also available, either from high intensity lighting or, for example, from leader cables.

These alternative programmes are not discussed in any detail since they are so similar to that for take off. While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

1. A ground run predictor for an aircraft, comprising means for generating signals defining successive intervals of time during which the aircraft travels the same predetermined distance along the ground, means controlled by said signals for generating further signals representative of the durations of the said intervals and means for storing the said further signals pertaining to the last $n$ intervals of time (where $n$ is at least three), a digital computer, an indicator coupled to said computer and means for setting into said computer a predetermined critical distance $S_c$, said computer being responsive to the stored $n$ further signals and to signals representing the distance travelled by the aircraft to compute the velocity and acceleration of the aircraft and to derive therefrom and apply to the indicator a signal representing the margin between the critical distance and the distance at which take-off is calculated to occur.

2. A ground run predictor according to claim 1, wherein the said means for generating the further signals comprise a source of regularly recurrent clock pulses and means for counting the clock pulses occurring during each of the said intervals, the predictor comprising $n$ registers for storing the counts for the last $n$ intervals.

3. A ground run predictor according to claim 2, wherein the said means for counting the pulses is a single counter which counts the pulses in each interval and means for clearing said counter to one of the registers at the end of each interval.

4. A ground run predictor according to claim 3, wherein the counter is always cleared to a first one of the registers and means for transferring the count in each register other than the last to the next succeeding register.

5. A ground run predictor according to claim 2, wherein the signals defining successive intervals of time are pulses which may or may not occur wholly between adjacent clock pulses from the said source and comprising a phase adjusting network responsive to the clock pulses to vary the phases of the pulses defining successive intervals of time so that each lies wholly between adjacent clock pulses before it is applied to the said means for generating further signals.

6. A ground run predictor according to claim 1, wherein the said means for generating signals defining successive intervals is coupled to a wheel of the aircraft to produce pulses representative in number of the number of revolutions of the wheel.

7. A ground run predictor according to claim 6, comprising an inductive pick-off on the wheel which produces pulses from which the representative pulses are produced.

8. A ground run predictor according to claim 2, wherein the digital computer computes a take off margin M in accordance with the equation $$M = S_c - S - h(V_c^2 - V^2)/2a$$

where $S_c$ is the critical distance,
$S$ is the distance gone,
$V_c$ is the critical velocity,
$V$ is the instantaneous velocity,
$a$ is the instantaneous acceleration, and $h$ is a modifying function defining the decrease in aircraft acceleration resulting from wind speed, substandard engine performance and other factors as the take-off proceeds, said computer comprising means for setting in the predetermined value of critical distance $S_c$.

9. A ground run predictor according to claim 8 wherein $a$, V and S are calculated in accordance with the equations:

$$a_{n-3} = \frac{6F^2C(P_{n-5}+P_{n-4}+P_{n-3}-P_{n-2}-P_{n-1}-P_n)}{(P_{n-5}+P_{n-4}+P_{n-3})(P_{n-2}+P_{n-1}+P_n)(P_{n-5}+P_{n-4}+P_{n-3}+P_{n-2}+P_{n-1}+P_n)}$$

$$V_{n-3} = \frac{3FC\{(P_{n-5}+P_{n-4}+P_{n-3})^2+(P_{n-2}+P_{n-1}+P_n)^2\}}{(P_{n-5}+P_{n-4}+P_{n-3})(P_{n-2}+P_{n-1}+P_n)(P_{n-5}+P_{n-4}+P_{n-3}+P_{n-2}+P_{n-1}+P_n)}$$

$$S_{n-3} = (n-3)C$$

where the successive intervals are numbered $1, 2 \ldots n$,
F is the frequency of the clock pulses,
C is the distance gone in each interval and $P_n$ is the count of clock pulses for the $n$th interval.

10. A ground run predictor according to claim 8, wherein $h$ is approximated by the computer as a function H computed in accordance with the equation:

$$H = \frac{V_c^2 + (V_c - V)\{V[b(V_c)+c(V_w)] + V_c[b'(V_c)+c'(V_w)]\}}{V_c^2}$$

where $V_w$ is wind speed
and $b(V_c)$, $c(V_w)$, $b'(V_c)$ and $c'(V_w)$ are constants determined empirically for different values of $V_c$ and $V_w$ and set into the computer in accordance with the known values of $V_c$ and $V_w$.

11. A ground run predictor according to claim 1, comprising a digital to analogue converter for converting a digital output from the computer representative of the said margin to a corresponding analogue signal, a servo mechanism and a movable margin-indicating member, said servo mechanism being responsive to the analogue signal to position said movable margin-indicating member forming the said indicator.

12. A ground run predictor according to claim 11, wherein the margin-indicating member comprises a strip and a window, said strip being movable behind the window, the strip being of two colours such that, when the margin is zero or negative, one colour only is seen whilst, when the margin is positive, a proportion of the strip of the other colour is seen, the length of the other colour visible increasing in proportion with the length of the margin (up to the point where only the said other colour is visible through the window).

13. A ground run predictor according to claim 1, wherein the said indicator comprises a row of separately illuminatable devices corresponding along the row to successive increments of margin and responsive to digital signals from the computer in such a way that no device is illuminated if the margin is zero or negative whilst the devices corresponding to the appropriate increments of margin are illuminated when the margin is positive.

References Cited in the file of this patent

UNITED STATES PATENTS 2,831,182   Kamins _____ Apr. 15, 1958